United States Patent [19]

Hashimoto

[11] Patent Number: 4,908,561
[45] Date of Patent: Mar. 13, 1990

[54] SERVO AMPLIFIER CIRCUIT
[75] Inventor: Shuichi Hashimoto, Tokyo, Japan
[73] Assignee: Fujitsu Limited, Kawasaki, Japan
[21] Appl. No.: 349,268
[22] Filed: May 9, 1989
[30] Foreign Application Priority Data
May 13, 1988 [JP] Japan ................................ 63-117628
[51] Int. Cl.$^4$ ............................................ G11B 21/08
[52] U.S. Cl. .................................... 318/677; 318/685;
318/616; 318/603; 360/77.02; 360/77.06;
360/78.01; 360/78.07
[58] Field of Search ................... 318/38, 135, 592–598,
318/561, 603, 615, 618, 608, 685, 687, 677;
388/800–850; 360/73.01, 73.07, 73.13, 77.01,
77.06, 77.07, 77.16, 77.17, 78.01, 78.05, 78.07,
78.08, 78.11, 78.14, 75

[56] References Cited
U.S. PATENT DOCUMENTS

| | | | |
|---|---|---|---|
| 4,270,073 | 5/1981 | Harman ............................. | 318/632 |
| 4,480,279 | 10/1984 | Hashimoto ...................... | 318/616 X |
| 4,485,418 | 11/1984 | Bremmer ......................... | 360/77.06 |
| 4,581,567 | 4/1986 | Yanagawa et al. ............. | 318/685 X |
| 4,627,043 | 12/1986 | Uehara ........................ | 360/78.01 X |
| 4,630,190 | 12/1986 | Alaimo et al. .................. | 318/603 X |
| 4,679,103 | 7/1987 | Workman ......................... | 360/78.07 |
| 4,775,825 | 10/1988 | Moribe et al. ................. | 318/685 X |
| 4,797,756 | 1/1989 | Yoshihara et al. ............... | 360/77.02 |

Primary Examiner—William M. Shoop, Jr.
Assistant Examiner—Paul Ip
Attorney, Agent, or Firm—Staas & Halsey

[57] ABSTRACT

A servo amplifier circuit, wherein a target value is obtained based on a detected output voltage of the servo amplifier circuit, and the absolute value of the target value is amplified, and then is inverted only when the target value is negative. An offset adusting is carried out by obtaining a forward offset as an output voltage of the servo amplifier circuit without an inversion and an adjustment when the target value is set to zero, and a reverse offset as an output voltage of the servo amplifier circuit with an inversion and without an adjustment when the target value is set to zero, and by obtaining an offset adjusting value using the forward offset and the reverse offset. The absolute value is modified using the offset adjusting value.

5 Claims, 14 Drawing Sheets

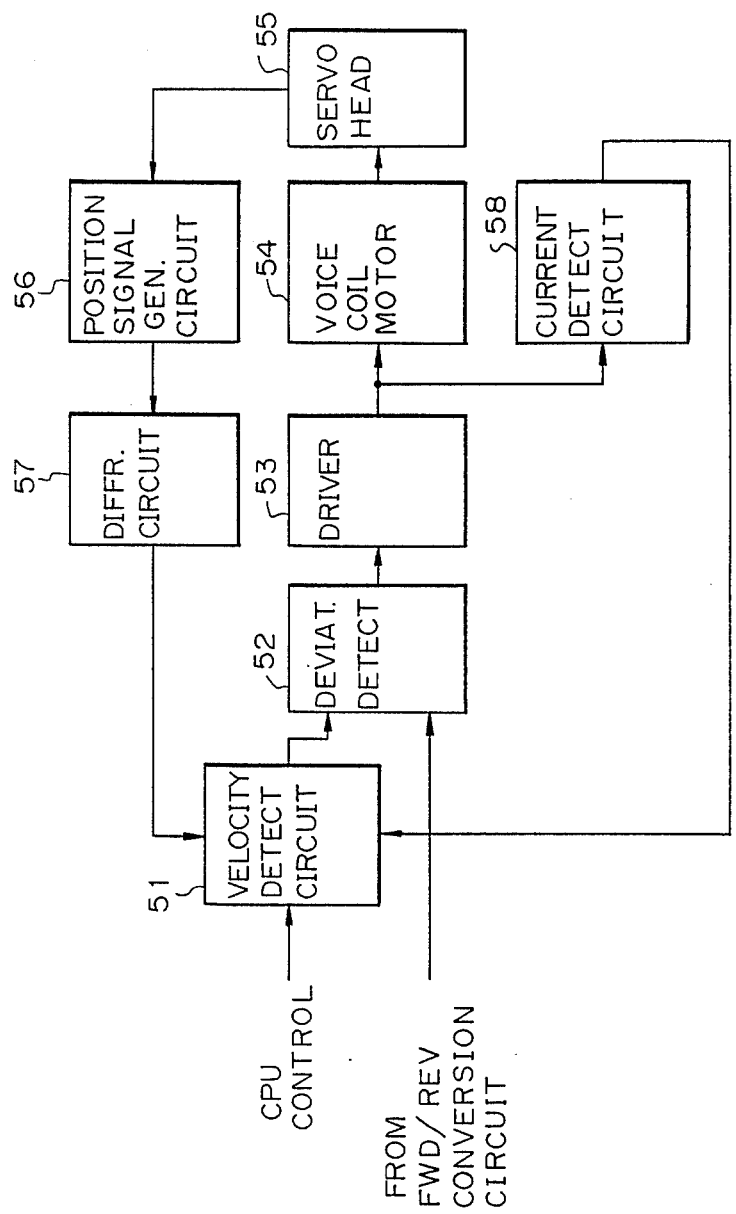

SERVO AMPLIFIER CIRCUIT

BACKGROUND OF THE INVENTION

1. Field of the Invention

The present invention relates to a servo amplifier circuit. In particular, it relates to a servo amplifier circuit having an amplifier portion and a inverting portion which inverts a polarity of an output of the amplifier.

The present invention is applicable to a servo system for a magnetic head in a magnetic disk device.

2. Description of the Related Art

In a magnetic disk device, the magnetic head is moved in two seek modes, a forward seek mode and a reverse seek mode, each corresponding to the direction of the motion of the magnetic head, i.e., corresponding to which side of the target track position the magnetic head exists when the target track position is commanded.

In a servo system for a magnetic head in a magnetic disk device, a servo amplifier circuit having an amplifier portion and an inverting portion which inverts the polarity of the output of the amplifier, is used since a specific non-linear amplifier gain characteristics are used because a fast seeking speed is required when the magnetic head is far from the target track position and a slow seeking speed is required when the magnetic head is near the target track position, and the characteristics are the same in both the forward seek mode and the reverse seek mode without the polarity. The inverting portion operates when the magnetic disk device is in a reverse seek mode.

FIG. 1 shows a construction of the conventional servo amplifier circuit used for a velocity control system for a magnetic head in a magnetic disk device. In FIG. 1, reference numeral 14 denotes a CPU, 25 denotes a target velocity setting circuit, 26 denotes a digital to analog converter, 27 denotes an operational amplifier, 28 denotes a gain characteristics setting circuit, 29 denotes a manual offset adjusting circuit, 30 denotes a forward/reverse conversion circuit, and 50 denotes a velocity control circuit.

The CPU 14 calculates and commands a target value of the velocity of the magnetic head as a digital form of a voltage value, based on the difference between the target track position and the actual track position at that time. The digital to analog converter 26 converts the digital target velocity voltage to an analog form. The analog target velocity voltage is input to an amplifier portion consisting of an operational amplifier, a gain characteristics setting circuit 28, a manual offset adjusting circuit 29, and resistors.

The gain characteristics setting circuit 28 is a resistor having a value which varies with a voltage applied between both terminals of the gain characteristics setting circuit 28, and the varying characteristics are such that the gain of the amplifier portion is large when the magnetic head is far from the target track position and the gain is small when the magnetic head is near the target track position. These characteristics are required because a fast seeking speed is required when the magnetic head is far from the target track position and because a slow seeking speed is required when the magnetic head is near from the target track position.

The manual offset adjusting circuit 29 is provided for manually adjusting an offset of the amplifier portion.

The forward/reverse conversion circuit 30 realizes the above inverting portion, and operates in the reverse seek mode under the control of the CPU 14. The output of the above amplifier portion passes through the forward/reverse conversion circuit 30 without polarity invertion in the forward seek mode, and the output of the above amplifier portion is inverted at the forward/reverse conversion circuit 30 in a reverse seek mode. The output of the forward/reverse conversion circuit 30 is input to the velocity control circuit 50 as a target voltage.

The velocity control circuit 50 detects the actual velocity of the magnetic head as a voltage, obtains a deviation of the actual velocity voltage from the target voltage, and then controls an current for driving a motor.

It is well-known that an analog circuit has an offset in its output, for example, an amplifier circuit comprising an operational amplifier has an offset in its output voltage, i.e., it has a non-zero voltage output (offset) even when its input voltage is zero.

Due to an offset generated in the amplifier portion comprising the operational amplifier 27, the gain characteristics setting portion 28, the manual offset adjusting portion 29, and the resistors, and another offset generated in the inverting portion 30, the output voltage of a servo amplifier circuit having a construction shown in FIG. 1, has characteristics as shown in FIG. 2 or FIG. 3.

In FIGS. 2 and 3, a curve which is denoted by "FWD seek" shows an output voltage of the servo amplifier circuit of FIG. 1 in the forward seek mode, and a curve which is denoted by "REV seek" shows an output voltage of the servo amplifier circuit of FIG. 1 in the reverse seek mode, as a function of the position of the magnetic head, and the position "O" denotes a target track position of the magnetic head.

In FIGS. 2 and 3, the overall position of the two curves are shifted with reference to the zero volt line due to the offset generated in the following stage of the amplifier portion in the construction of FIG. 1.

When the offset generated in the amplifier portion has the same polarity as the polarity of the remaining component (other than the offset) of a non-zero output of the amplifier portion, i.e., positive, the two curves corresponding to the forward seek and the reverse seek are apart from each other as shown in FIG. 2, and when the offset generated in the amplifier portion has the opposite polarity to the polarity of the remaining component (other than the offset) of a non-zero output of the amplifier portion, i.e., positive, the two curves corresponding to the forward seek and the reverse seek intersect as shown in FIG. 3.

Further, in FIGS. 2 and 3, the above curves of the FWD seek and the REV seek continue to the target track position, and each voltage in the forward seek mode and the reverse seek mode has a non-zero value, respectively denoted by $V_F$ and $V_R$.

Generally, in a sevo system of a magnetic head which is used in a magnetic disk device, the control is changed from the velocity servo control as mentioned above to a fine position control when the magnetic head approaches the target track position to a predetermined degree. Therefore, the above non-zero values $V_F$ and $V_R$ in the vicinity of the target track position in the velocity servo affect a positioning accuracy of the magnetic head. In particular, the difference between the values $V_F$ and $V_R$ results in different positioning accuracy in the forward seek mode and the reverse seek mode.

Therefore, it is necessary to reduce the above difference between the output voltage values $V_F$ and $V_R$ in the vicinity of the target track position, i.e., at the target track position in the velocity servo stage.

For the above purpose, the manual offset adjust circuit 29 is provided. The operator can manually adjust the output level of the above-mentioned amplifier portion at the manual offset adjust circuit 29, and the output voltages of the servo amplifier circuit in the forward seek mode and the reverse seek mode are changed as shown in FIG. 4, and thus the characteristics of the output voltage of the servo amplifier circuit as shown in FIG. 5 can be obtained.

However, the manual adjusting of offset is troublesome, and the manual adjusting of offset cannot follow the changes of the characteristics of the analog circuit due to a deterioration due to age or temperature variation.

Otherwise, it may be possible to reduce the offset by using high-precision components for constructing the circuit. However, this causes an increase in cost.

SUMMARY OF THE INVENTION

The object of the present invention is to provide a servo amplifier circuit having an amplifier portion and a inverting portion which inverts a polarity of an output of the amplifier, whereby a difference between the offsets which appear in the output voltages when the inverting portion operates and when the inverting portion does not operate, can be automatically reduced.

According to the present invention, there is provided a servo amplifier circuit comprising: an output voltage detecting means for detecting an output voltage of the servo amplifier circuit; a target value obtaining means for obtaining a target value of the servo amplifier circuit; an absolute value outputting means for outputting an absolute value of the target value; a control direction outputting means for outputting a sign of the target value; an amplifier means for amplifying an output of the absolute value outputting means; a forward/reverse conversion means for passing the output of the amplifier means with or without inverting the output in accordance with the sign of the target value; a forward offset obtaining means for obtaining a forward offset which is defined as an output voltage of the servo amplifier circuit without an adjustment when the absolute value is set to zero and the sign is set to plus; a reverse offset obtaining means for obtaining a reverse offset which is defined as an output voltage of the servo amplifier circuit without an adjustment when the absolute value is set to zero and the sign is set to minus; an offset adjusting value obtaining means for obtaining an offset adjusting value using the forward offset and the reverse offset; and an offset adjusting means for modifying the input of the amplifier means using the offset adjusting value, so that the difference between the forward offset and the reverse offset is reduced.

BRIEF DESCRIPTION OF THE DRAWINGS

In the drawings:

FIG. 12 shows the construction of the velocity control circuit 50 in an embodiment of the present invention;

DESCRIPTION OF THE PREFERRED EMBODIMENTS

Before describing the preferred embodiment of the present invention, first, the basic principle of the present invention is explained below.

Figure 6:
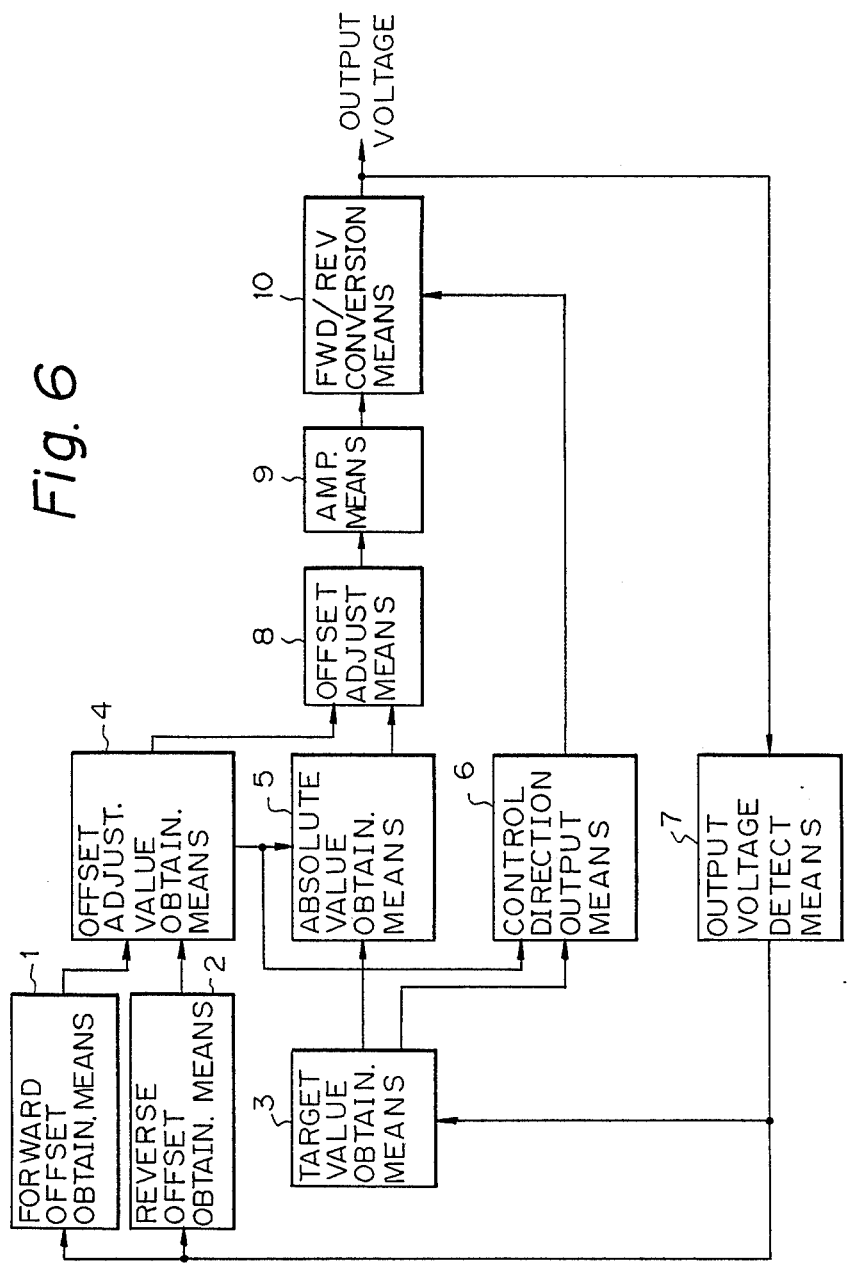
FIG. 6 shows the basic construction of the present invention.

FIG. 6 shows the basic construction of the present invention.

In FIG. 6, 1 denotes a forward offset obtaining means, 2 denotes a reverse offset obtaining means, 3 denotes a target value obtaining means, 4 denotes an offset adjusting value obtaining means, 5 denotes an absolute value outputting means, 6 denotes a control direction outputting means, 7 denotes an output voltage detecting means, 8 denotes an offset adjusting means, 9 denotes an amplifier means, and 10 denotes a forward-/reverse conversion means.

The output voltage detecting means 7 detects an output voltage of the servo amplifier circuit.

The target value obtaining means 3 obtains a target value of the output voltage.

The absolute value outputting means 5 outputs an absolute value of the target value.

The control direction outputting means 6 outputs a sign of the target value.

The amplifier means 9 amplifies an output of the absolute value outputting means 5.

The forward/reverse conversion means 10 passes the output of the amplifier means 9 with or without inversion in accordance with the sign of the target value.

The forward offset obtaining means 1 obtains an output voltage of the servo amplifier circuit without an adjustment when the absolute value is set to zero and the sign is set to plus, as a forward offset.

The reverse offset obtaining means 2 obtains an output voltage of the offset adjust circuit without an adjustment when the absolute value is set to zero and the sign is set to minus, as a reverse offset.

The offset adjusting value obtaining means 4 obtains an offset adjusting value using the forward offset and the reverse offset.

The offset adjusting means 8 modifies the input of the amplifier means 9 using the offset adjusting value, so that the difference between the forward offset and the reverse offset is reduced.

Figure 1:
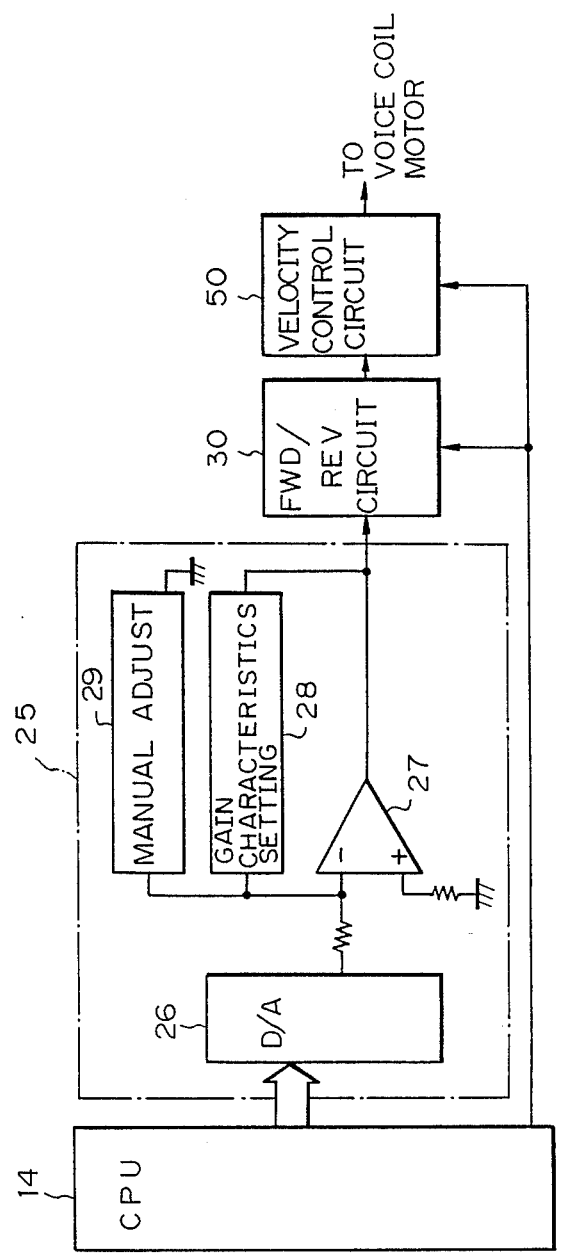
FIG. 1 shows the construction of a conventional servo amplifier circuit.
Figure 2:
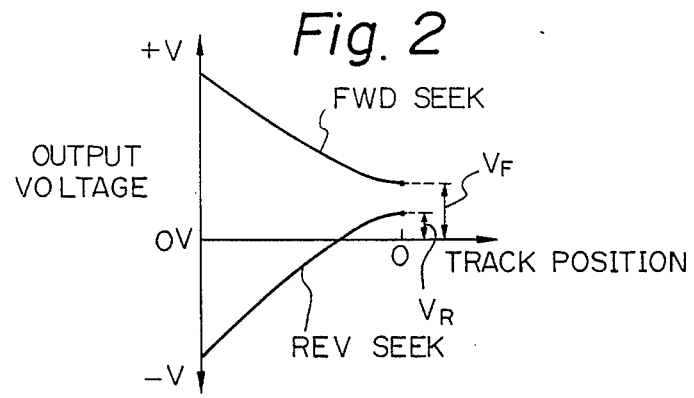
FIGS. 2 and 3 show an example of output voltages of the conventional servo amplifier circuit shown in FIG. 1.
Figure 3:
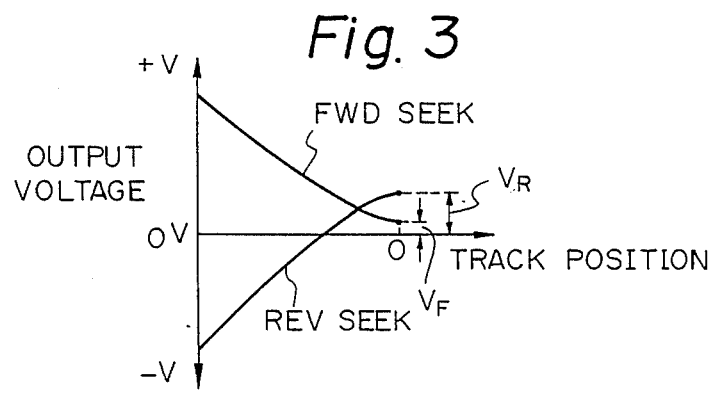
Figure 4:
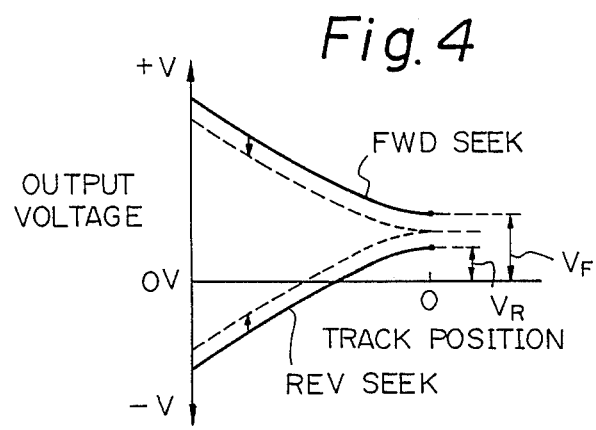
FIG. 4 shows an example of a conventional manual offset adjusting procedure.
Figure 5:
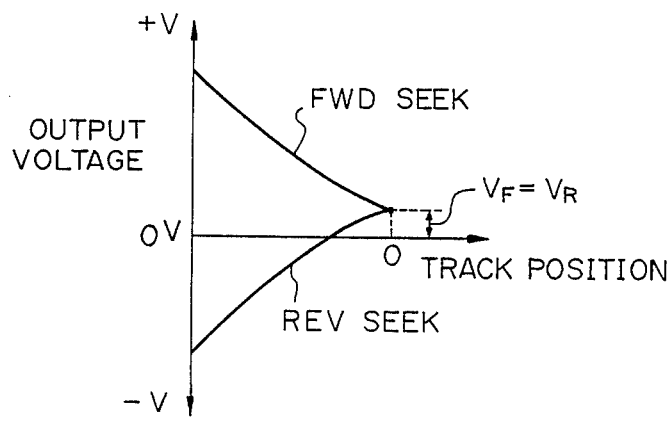
FIG. 5 shows an example of the output voltages after offset adjusted.

The target value obtaining means 3, the absolute value outputting means 5, the control direction outputting means 6, the amplifier means 9, and the forward-/reverse conversion means 10 substantially correspond to the conventional construction shown in FIG. 1.

According to the present invention, an automatic adjustment of the offset in the output of the servo amplifier circuit, is carried out through the following steps.

In the first step, an output voltage of the offset adjust circuit without an adjustment when the absolute value is set to zero and the sign is set to plus, is obtained, as a forward offset.

In the second step, an output voltage of the offset adjust circuit without an adjustment when the absolute value is set to zero and the sign is set to minus, is obtained, as a reverse offset.

In the third step, an offset adjusting value is obtained by using the forward offsets and the reverse offset.

In the fourth step, the input of the amplifier means 9 is modified using the offset adjusting value.

Thus, the difference between the forward offsets and the reverse offset is reduced.

In an embodiment of the present invention, the above modification of the input of the amplifier means 9 using the offset adjusting value, is achieved by adding, i.e., the summation of the output of the absolute value outputting means 5 and the offset adjusting value is applied instead of the output of the absolute value outputting means 5 only.

Further, in an embodiment of the present invention, the above offset adjusting value is obtained as half of the deviation of the reverse offset from the forward offset.

Next, the hardware construction of the preferred embodiment of the present invention is explained with reference to FIG. 7.

Figure 7:
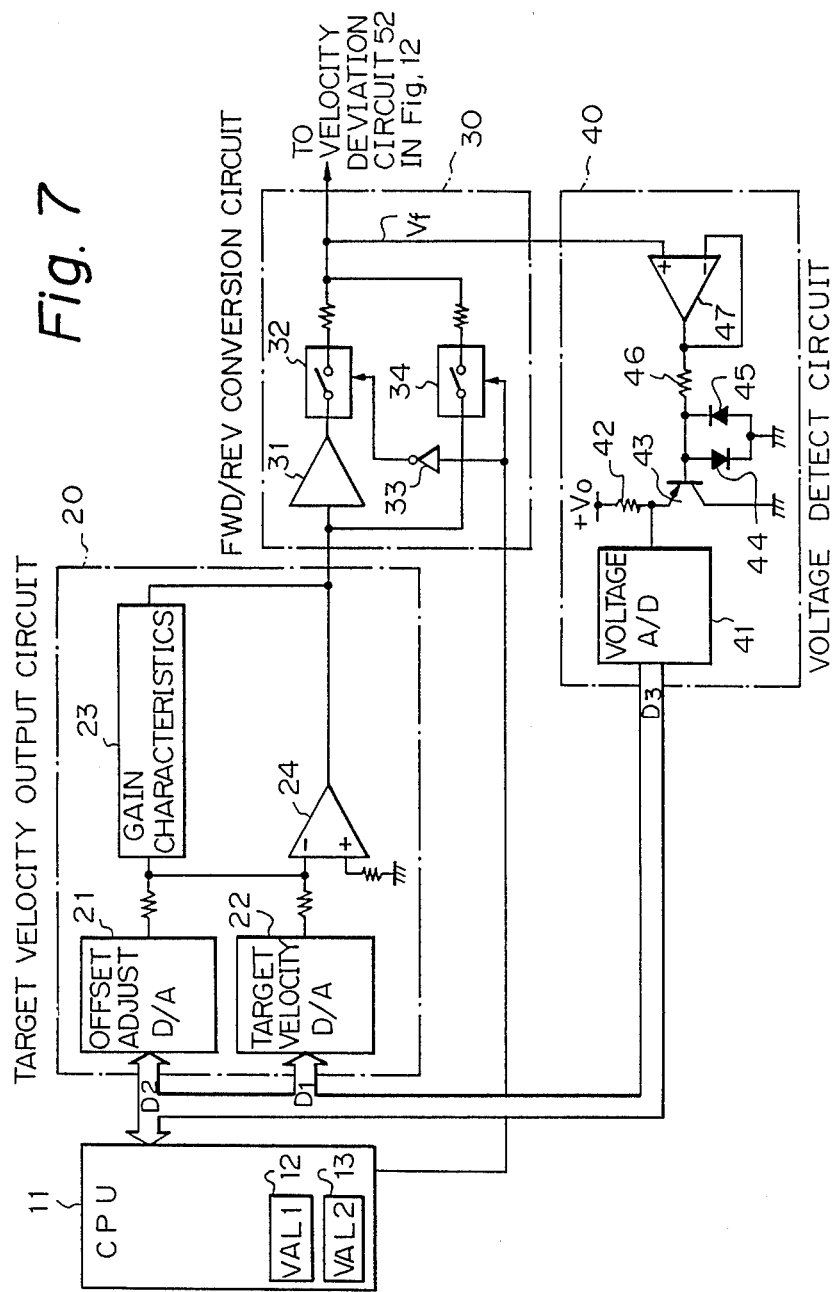
FIG. 7 shows the construction of an embodiment of the present invention.

FIG. 7 shows a hardware construction realizing the embodiment of the present invention.

In FIG. 7, 11 denotes a CPU, 12 and 13 each denote a register, 20 denotes a target velocity voltage output circuit, 21 denotes an offset adjusting value digital to analog converter, 22 denotes a target velocity voltage digital to analog converter, 23 denotes a gain characteristic setting circuit, 24 denotes an operational amplifier, 30 denotes a forward/reverse conversion circuit, 31 denotes an inverting amplifier, 32 and 34 each denote an ON/OFF switch, 33 denotes a logical inverter, 40 denotes a voltage detect circuit, 41 denotes a voltage analog to digital converter, 42 and 46 each denote a resistor, 43 denotes a transistor, 44 and 45 each denote a diode, and 47 denotes an operational amplifier.

Among the above components, the target velocity voltage digital to analog converter 22, the gain characteristic setting circuit 23, and the operational amplifier 24 are each substantially the same as the digital to analog converter 26, the gain characteristic setting circuit 28, and the operational amplifier 27 in the construction of FIG. 1. The forward/reverse conversion circuit 30 is substantially the same as the corresponding one shown in FIG. 1.

In the target velocity voltage output circuit 20, the offset adjusting value digital to analog converter 21 is provided for obtaining an analog form of an offset adjusting value, i.e., an offset adjusting voltage. The digital offset adjusting value is obtained in the CPU 11 by the operations described later.

The outputs of the offset adjusting digital to analog converter 21 and the output of the target velocity voltage digital to analog converter 22 are each applied to the inverting input terminal of the operational amplifier 24 through a corresponding resistor. The terminals of the gain characteristic setting circuit 23 are each connected to the inverting input terminal and the output terminal of the operational amplifier 24, and the non-inverting input terminal of the operational amplifier 24 is connected to earth through a resistor.

Thus, through the above construction of the inversion amplifier, a summation of the offset adjusting value and the target velocity voltage according to the present invention is obtained.

In the forward/reverse conversion circuit 30, when the polarity of the target velocity is positive, i.e., in the forward seek mode, the switch 34 is made ON and the switch 32 is made OFF under the control of the CPU 11, and thus the output of the target velocity voltage output circuit 20 is output as the output of the servo amplifier circuit without inversion of the polarity.

When the polarity of the target velocity is positive, i.e., in the forward seek mode, the switch 32 is made ON and the switch 34 is made OFF under the control of the CPU 11, and thus the polarity of the output of the target velocity voltage output circuit 20 is inverted through the inverting amplifier 31, and is output as the output of the servo amplifier circuit.

The output of the forward/reverse conversion circuit 30 is applied to a non-inverting input terminal of the operational amplifier 47 of the voltage detect circuit 40. The operational amplifier 47 constitutes a voltage follower amplifier, and the output of the forward/reverse conversion circuit 30 is amplified through the voltage follower amplifier. The output of the voltage follower amplifier is applied to a base terminal of the pnp transistor 43 through the resistor 46. The base terminal of the transistor 43 is connected to a limiter circuit consisting of the diodes 44 and 45.

The diodes 44 and 45 are connected in parallel between the base terminal of the transistor 43 and earth, where the diode 44 is connected in the direction from the base terminal of the transistor 43 to earth, and the diode 45 is connected in the direction from earth to the base terminal of the transistor 43.

Figure 8:
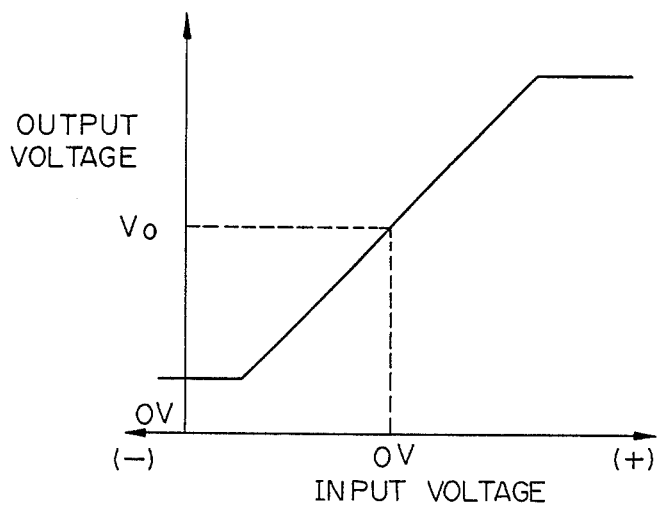
FIG. 8 shows the input-output relationship in the limiter circuit in the voltage detect circuit 40 in FIG. 7.

The effect of the above limiter circuit is shown in FIG. 8. Namely, the limiter circuit prevents application of an extremely high or low voltage to the next stage.

The emitter terminal of the transistor 43 is connected to a high voltage source $+V_O$ through the resistor 42, and the collector terminal of the transistor 43 is connected to earth. Thus the transistor 43 and the resistor 42 constitute a level shift circuit. The output of the level shift circuit is obtained from the emitter terminal of the transistor 43.

Figure 9:
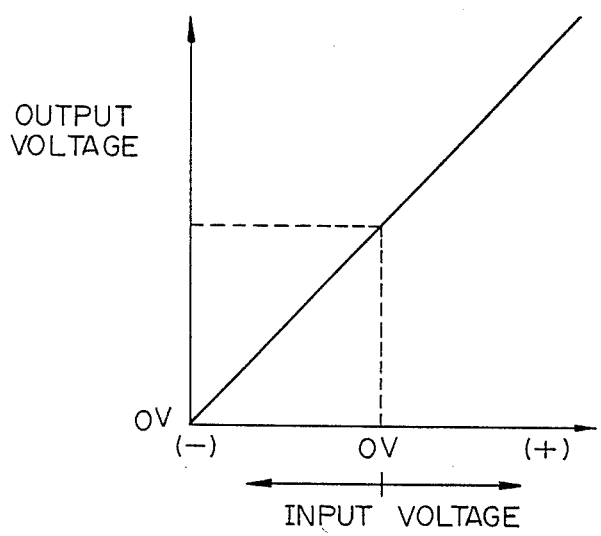
FIG. 9 shows the input-output relation ship in the level shift circuit in the voltage detect circuit 40 in FIG. 7.

The level shift circuit is provided because the range of the input voltage of commercially available analog to digital converters must be in a voltage region of a single polarity. The effect of the above level shift circuit is shown in FIG. 9.

The output of the level shift circuit is input into the voltage analog to digital converter 41, and then the digital output of the voltage analog to digital converter 41 is input into the CPU 11.

Figure 10:
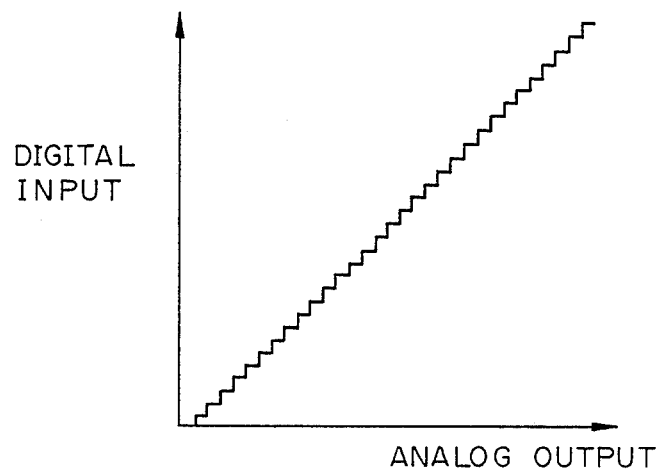
FIG. 10 shows the input-output relation ship in the digital to analog converter 21 in FIG. 7.
Figure 11:
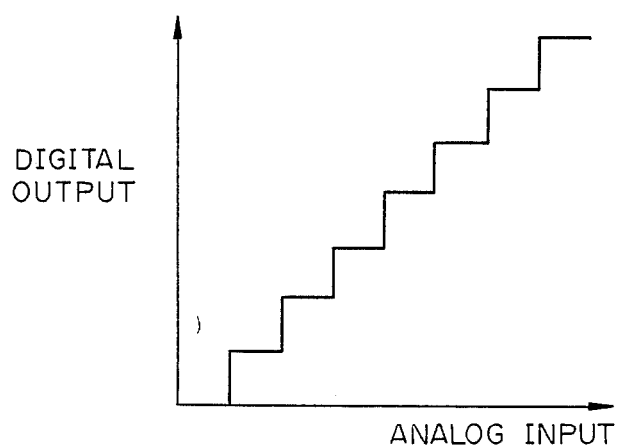
FIG. 11 shows the input-output relation ship in the analog to digital converter 41 in FIG. 7.

FIGS. 10 and 11 each show a input-output relationship in the offset adjusting value digital to analog converter 21 and the voltage analog to digital converter 41.

As shown in FIGS. 10 and 11, the resolution of the voltage analog to digital converter 41 shown in FIG. 11 is much lower than the resolution of the offset adjust value digital to analog converter 21 shown in FIG. 10.

The lower resolution of the detected voltage analog to digital converter 41 is allowed by carrying out operations for obtaining an offset adjusting value according to the embodiment of the present invention, which is described later.

The output of the servo amplifier circuit shown in FIG. 7 is input into the velocity control circuit as the conventional servo amplifier circuit shown in FIG. 1, to obtain the motor driving current.

FIG. 12 shows a construction of a motor driving system including the velocity control circuit.

In FIG. 12, reference numeral 51 denotes a velocity detect circuit, 52 denotes a deviation detect circuit, 53 denotes a driver circuit, 54 denotes a voice coil motor, 55 denotes a servo head, 56 denotes a position signal generation circuit, 57 denotes a differential circuit, and 58 denotes a current detect circuit.

The servo head 55 is a magnetic head the track position of which is controlled to be changed by using the velocity control system including the servo amplifier circuit according to the present invention.

The voice coil motor 54 is used for moving the servo head amplifier in accordance with the motor driving current which is supplied from the driver circuit 53.

The position signal generation circuit 56 detects a track position of the servo head 55 by counting the number of the track, and outputting a position signal. The position signal is differentiated by the differential circuit 57 to obtain velocity information, and then, the result is input into the velocity detect circuit 51.

On the other hand, the motor driving current is detected by the current detect circuit 58, and the detected current is also input into the velocity detect circuit 51.

The velocity detect circuit 51 detects the velocity of the servo head 55 using both the information obtained through the position signal and the driving current.

The output of the velocity detect circuit 51 is input into one of the input terminals of the deviation detect circuit 52, as a detected velocity. The output of the servo amplifier circuit according to the present invention, i.e., the output of the forward/reverse conversion circuit 30 is input into the other input terminal of the deviation detect circuit 52, as a target velocity (voltage).

The deviation detect circuit 52 obtains a deviation of the detected velocity from the target velocity, and the result is input into the driver circuit 53. The driver circuit 53 outputs the motor driving current according to the output of the deviation detect circuit 52.

Figure 13D:
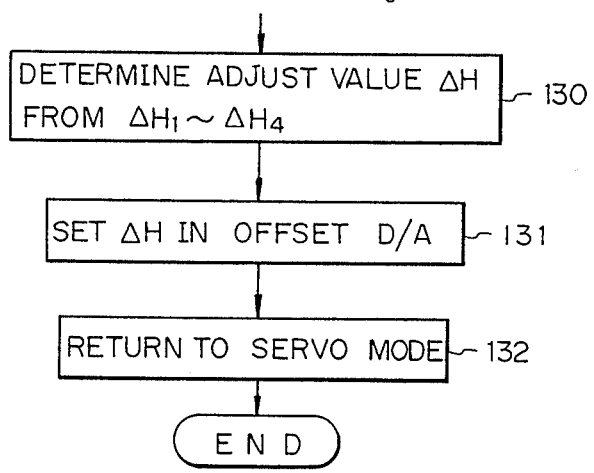
FIGS. 13A to 13D show a flow of the operations for obtaining an amount of the offset adjust value.
Figure 13A:
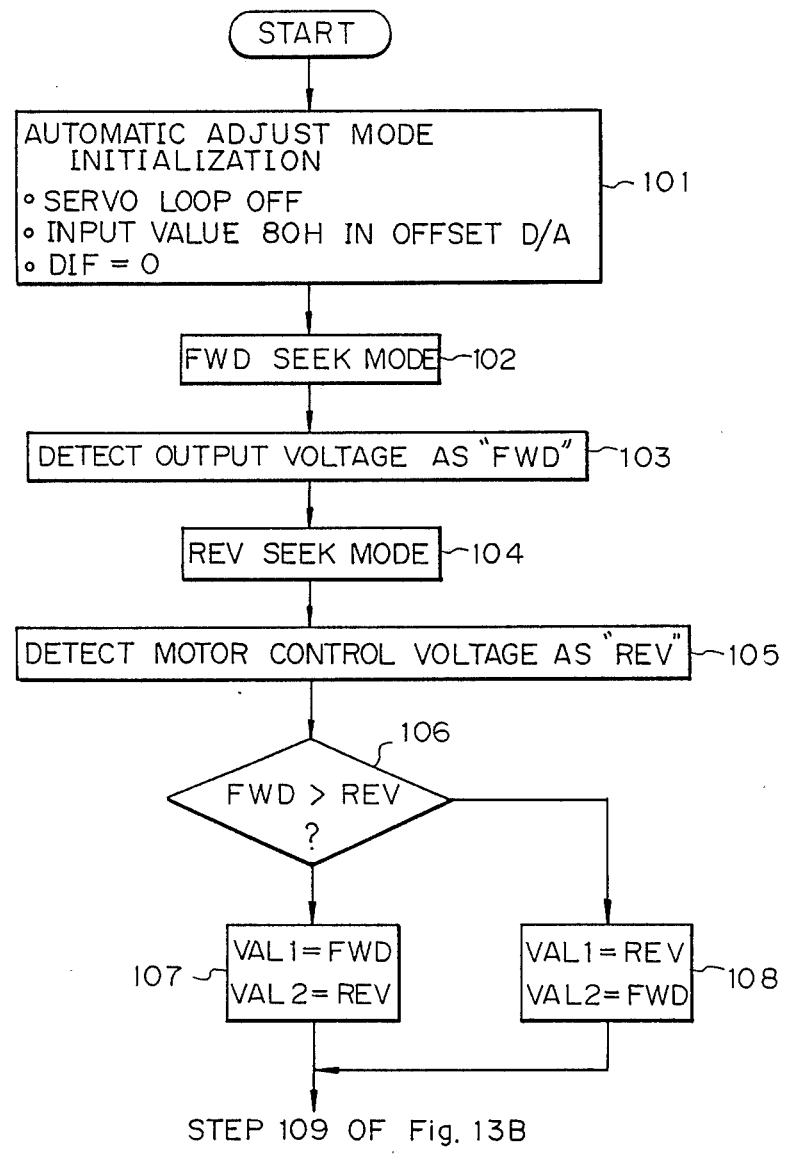
Figure 13:
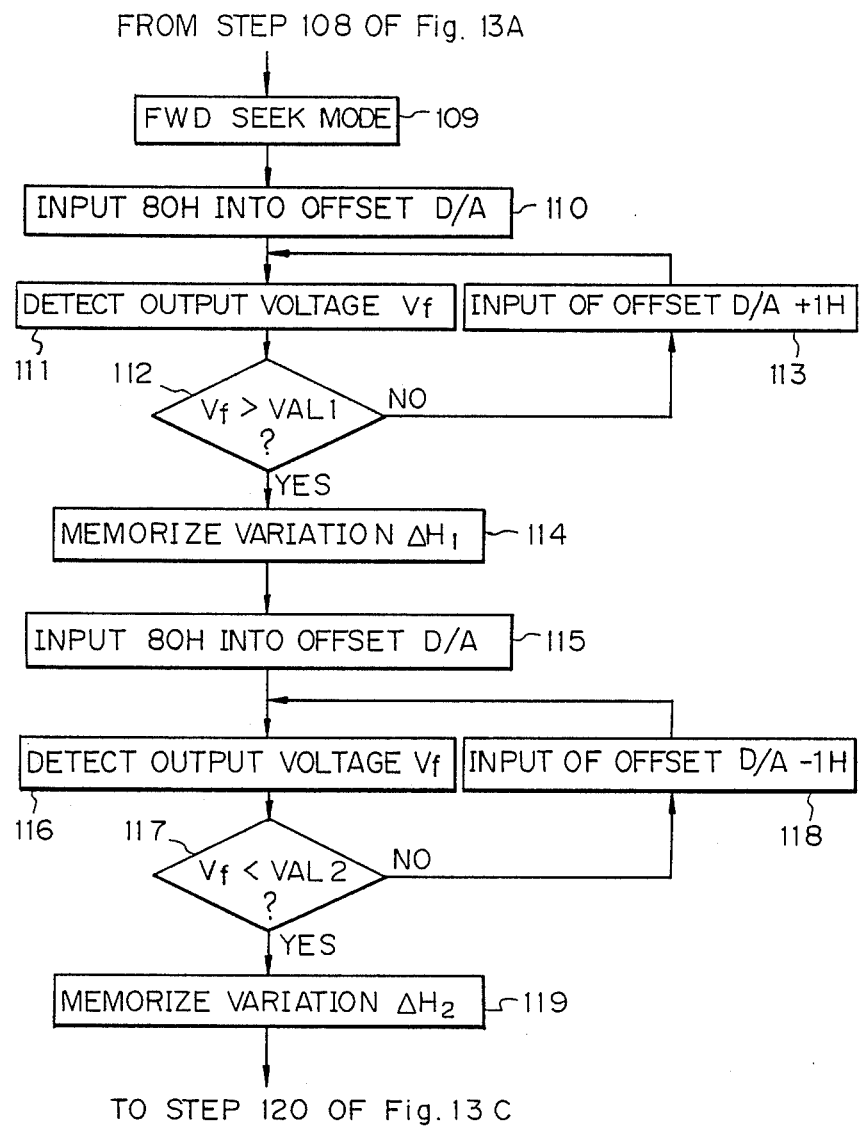
Figure 13C:
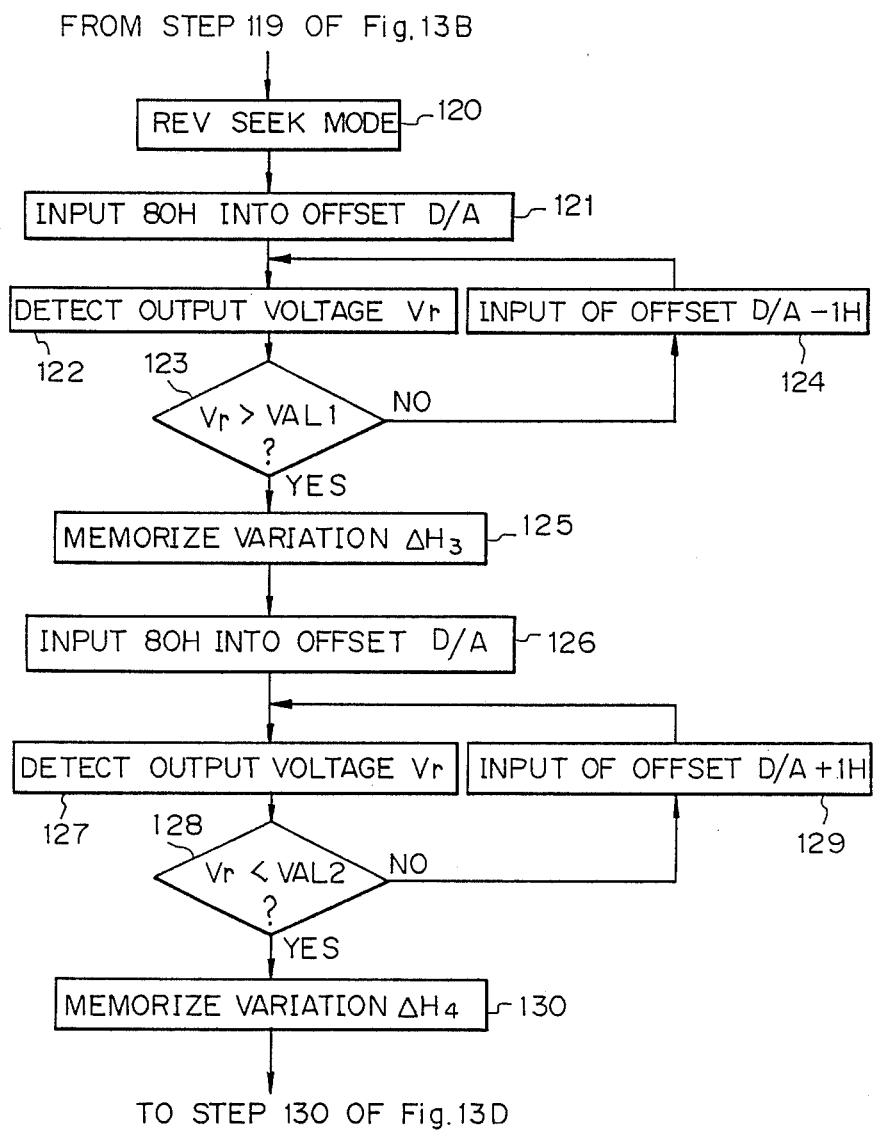

FIGS. 13A, 13B, and 13C show a flow of operations for obtaining an amount of the offset adjusting value.

In the step 101 of FIG. 13A, the servo system for the magnetic head in the magnetic disk device including the servo amplifier circuit according to the present invention, is set to an automatic adjusting mode, i.e., the servo system is initialized by the operations including the following first to third operations.

In the first operation of the initialization, the servo loop in the servo system is made OFF. The servo loop is a negative feedback loop shown in FIG. 12. Thus the operation of the construction of FIG. 12 is made OFF under the control of the CPU 11.

In the second operation of the initialization, digital data corresponding to the zero output voltage of the target velocity voltage digital to analog converter 22, is set as an input of the target velocity voltage digital to analog converter 22, and thus the output voltage of the target velocity voltage digital to analog converter 22 is made zero.

In the third operation of the initialization, the digital value "80H" (where H indicates that "80" is a number expressed in a hexadecimal notation) is input into the offset adjusting value digital to analog converter 21. "80H" is the center value of the input range of an eight-bit digital to analog converter, and this value corresponds to the zero level output of the offset adjusting value digital to analog converter 21, i.e., corresponds to the zero level of the offset adjust voltage.

In the step 102, the forward seek mode is set, i.e., the switch 34 is set ON and the switch 32 is set OFF in the forward/reverse conversion circuit 30.

In the step 103, the output voltage of the servo amplifier circuit of FIG. 7 is detected as a forward offset "FWD" in the condition which was set in the steps 101 and 102.

The operations in the steps 102 and 103 corresponds to the function of the forward offset obtaining means 1.

In the step 104, the reverse seek mode is set, i.e., the switch 32 is set ON and the switch 34 is set OFF in the forward/reverse conversion circuit 30.

In the step 105, the output voltage of the servo amplifier circuit of FIG. 7 is detected as a reverse offset "REV" in the condition which was set in the step 101 and 104.

The operations in the steps 102 and 103 correspond to the function of the reverse offset obtaining means 2.

In the step 106, the forward offset "FWD" and the reverse offset "REV" are compared and it is determined which is larger than the other.

If the forward offset "FWD" is larger than the reverse offset "REV", the forward offset "FWD" is held in the register 12 as a value "VAL1" and the reverse offset "REV" is held in the register 13 as a value "VAL2" in the step 107, or if the reverse offset "FWD" is not larger than the forward offset "REV", the reverse offset "REV" is held in the register 12 as a value "VAL1" and the forward offset "FWD" is held in the register 13 as a value "VAL2" in the step 108.

Next, in the step 109 of FIG. 13B, the forward seek mode is set, and then the aforementioned digital data "80H" is input into the offset adjusting digital to analog converter 21, in the step 110.

In the step 111, the output voltage $V_f$ is detected by the voltage detect circuit 40, and then the detected value $V_f$ is compared with the above value "VAL1" which has been held in the register 12, in the step 112.

If it is determined that the detected value $V_f$ is larger than the value "VAL1" in the step 112, the variation of the input of the offset adjusting value digital to analog converter 21 when the detected value $V_f$ becomes larger than the value "VAL1" is memorized as "$\Delta H_1$" in the step 114.

If it is determined that the detected value $V_f$ is not larger than the value "VAL1" in the step 112, the variation of the input of the offset adjusting value digital to analog converter 21 is incremented in the step 113, and then the output voltage $V_f$ is detected again in the step 111.

Namely, in the steps 110 to 114, the variation of the input value of the offset adjusting digital to analog converter 21 in the increasing direction when the corresponding voltage output $V_f$ becomes larger than the value "VAL1", is obtained and is memorized as "ΔH₁".

Then, in the step 115, the aforementioned digital data "80H" is input into the offset adjusting digital to analog converter 21.

In the step 116, the output voltage $V_f$ is detected by the voltage detect circuit 40, and then the detected value $V_f$ is compared with the above value "VAL2" which has been held in the register 13, in the step 117.

If it is determined that the detected value $V_f$ is smaller than the value "VAL2" in the step 117, the variation of the input of the offset adjusting value digital to analog converter 21 when the detected value $V_f$ becomes smaller than the value "VAL2", is memorized as "ΔH₂" in the step 119.

If it is determined that the detected value $V_f$ is not smaller than the value "VAL2" in the step 117, the variation of the input of the offset adjusting value digital to analog converter 21 is decremented in the step 118, and then the output voltage $V_f$ is detected again in the step 116.

Namely, in the steps 115 to 119, the variation of the input value of the offset adjusting digital to analog converter 21 in the decreasing direction when the corresponding voltage output $V_f$ becomes smaller than the value "VAL1", is obtained and is memorized as "ΔH₂".

Since the resolution of the voltage analog to digital converter 41 is lower than the resolution of the offset adjusting digital to analog converter 21, and the gain in the amplifier portion in the target velocity voltage output circuit 20 is small in the vicinity of the target voltage value zero, generally, the output voltage $V_f$ of the servo amplifier circuit, which is obtained through the voltage analog to digital converter 41 does not respond to the small variation of the input of the offset adjusting digital to analog converter 21, by a one to one correspondance. Therefore, the above repeating of the steps from incrementing the input of the offset adjusting digital to analog converter 21 and comparing the resulting output voltage of the servo amplifier circuit, is necessary to obtain the information of the forward offset with a high resolution, i.e., in the resolution of the offset adjusting digital to analog converter 21.

In other words, a high resolution is not required for the voltage analog to digital converter 41 when carrying out the above operations.

Figure 14:
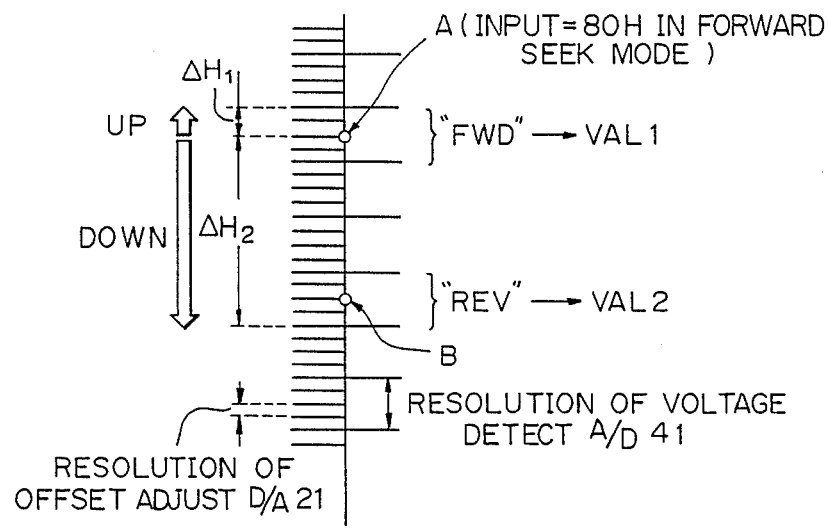
FIGS. 14 to 19 show the operations for obtaining an amount of the offset adjust value.

An example of the above operations in the steps 109 to 119 are shown in FIG. 14. On the left side of FIG. 14, the scale of the input of the offset adjusting digital to analog converter 21 is shown in the up and down direction, and on the right side, the corresponding scale of the output of the voltage analog to digital converter 41 is shown. The above input value "80H" of the offset adjusting digital to analog converter 21 in the forward seek mode is denoted by "A", and the above input value "80H" of the offset adjusting digital to analog converter 21 in the reverse seek mode is denoted by "B" in FIG. 14.

Next, in the steps 120 to 130 of FIG. 13C, the operations similar to the operations in the above steps 109 to 119 are carried out in the reverse seek mode.

In the step 120 of FIG. 13C, the reverse seek mode is set, and then the aforementioned digital data "80H" is input into the offset adjusting digital to analog converter 21, in the step 121.

In the step 122, the output voltage $V_f$ is detected by the voltage detect circuit 40, and then the detected value $V_f$ is compared with the above value "VAL1" which has been held in the register 12, in the step 123.

If it is determined that the detected value $V_f$ is larger than the value "VAL1" in the step 123, the variation of the input of the offset adjusting value digital to analog converter 21 when the detected value $V_f$ becomes larger than the value "VAL1", is memorized as "ΔH₃" in the step 125.

If it is determined that the detected value $V_f$ is not larger than the value "VAL1" in the step 123, the variation of the input of the offset adjusting value digital to analog converter 21 is decremented in the step 124, and then the output voltage $V_f$ is detected again in the step 122.

Namely, in the steps 121 to 125, the variation of the input value of the offset adjusting digital to analog converter 21 in the decreasing direction when the corresponding voltage output $V_f$ becomes larger than the value "VAL1", is obtained and is memorized as "ΔH₃".

Then, in the step 126, the aforementioned digital data "80H" is input into the offset adjusting digital to analog converter 21.

In the step 127, the output voltage $V_f$ is detected by the voltage detect circuit 40, and then the detected value $V_f$ is compared with the above value "VAL2" which has been held in the register 13, in the step 128.

If it is determined that the detected value $V_f$ is smaller than the value "VAL2" in the step 128, the variation of the input of the offset adjusting value digital to analog converter 21 when the detected value $V_f$ becomes smaller than the value "VAL2", is memorized as "ΔH₄" in the step 130.

If it is determined that the detected value $V_f$ is not smaller than the value "VAL2" in the step 128, the variation of the input of the offset adjusting value digital to analog converter 21 is incremented in the step 129, and then the output voltage $V_f$ is detected again in the step 127.

Namely, in the steps 126 to 130, the variation of the input value of the offset adjusting digital to analog converter 21 in the increasing direction when the corresponding voltage output $V_f$ becomes smaller than the value "VAL2", is obtained and is memorized as "ΔH₄".

Figure 15:
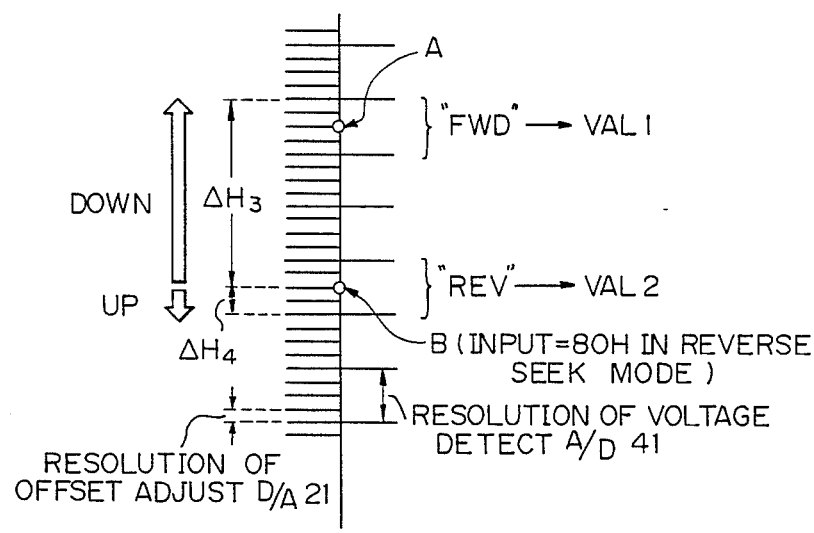

An example of the above operations in the steps 120 to 130 are shown in FIG. 15. On the left side of FIG. 15, the scale of the input of the offset adjusting digital to analog converter 21 is shown in the up and down direction, and on the right side, the corresponding scale of the output of the voltage analog to digital converter 41 is shown. The above input value "80H" of the offset adjusting digital to analog converter 21 in the forward seek mode is denoted by "A", and the above input value "80H" of the offset adjusting digital to analog converter 21 in the reverse seek mode is denoted by "B" in FIG. 15.

Finally, in the steps 130 to 132, the offset adjusting value is obtained using the above information on the forward and reverse offsets.

In the step 130 of FIG. 13D, the offset adjusting value is obtained using the above information on the forward and reverse offsets. In this embodiment, the average of the above four values of the variations "ΔH₁, ΔH₂, ΔH₃, and ΔH₄." is obtained.

For example, in the example shown in FIGS. 14 and 15, it is shown that $\Delta H_1 = +2$, $\Delta H_2 = -14$, $\Delta H_3 = 14$, $\Delta H_4 = +2$. Therefore, the offset adjusting value is obtained as $\Delta H = -6$.

In the step 131, the obtained offset adjusting value is set as the input of the offset adjusting digital to analog converter 21, and then the automatic offset adjusting mode is ended and the system is returned to a servo mode wherein the servo loop is made ON.

As understood by referring to FIGS. 14 and 15, the average of the four values of the variations $\Delta H_1$, $\Delta H_2$, $\Delta H_3$, and $\Delta H_4$, corresponds to half of the voltage deviation of the point A from the point B in the resolution of the offset adjusting value digital to analog converter 21.

Figure 16:
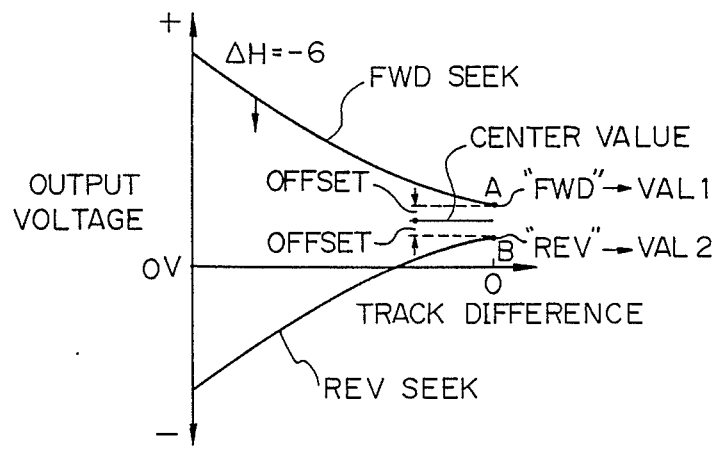
Figure 17:
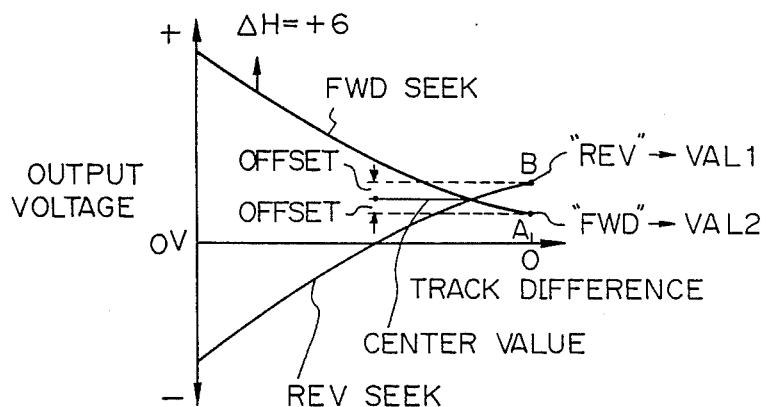

As shown in FIGS. 16 and 17, the characteristic curves of the output voltages in the forward seek mode and the reverse seek mode are symmetrical with regard to the line which is defined as V=the center value of the values "FWD" and "REV", and changes symmetrically when the offset adjusting value is changed. Therefore, when the offset adjusting value is set to an amount corresponding to half of the voltage distance between the point A and the point B, the difference between the output voltages in the forward seek mode and the reverse seek mode is reduced to zero. Further, if the amount is set in a high resolution as the resolution in the offset adjusting value digital to analog converter 21 in this embodiment, the reduction of the difference is carried out at high resolution.

As the value "FWD" is larger than the value "REV" in the example shown in FIGS. 14 and 15, this example corresponds to the case shown in FIG. 16. In the case shown in FIG. 16, if the offset adjusting value is set as the amount corresponding to half of the voltage deviation of the point A from the point B, i.e., $\Delta H = -6$, the output voltages in the forward seek mode and the reverse seek mode become equal to the center value when the track difference is zero.

Figure 18:
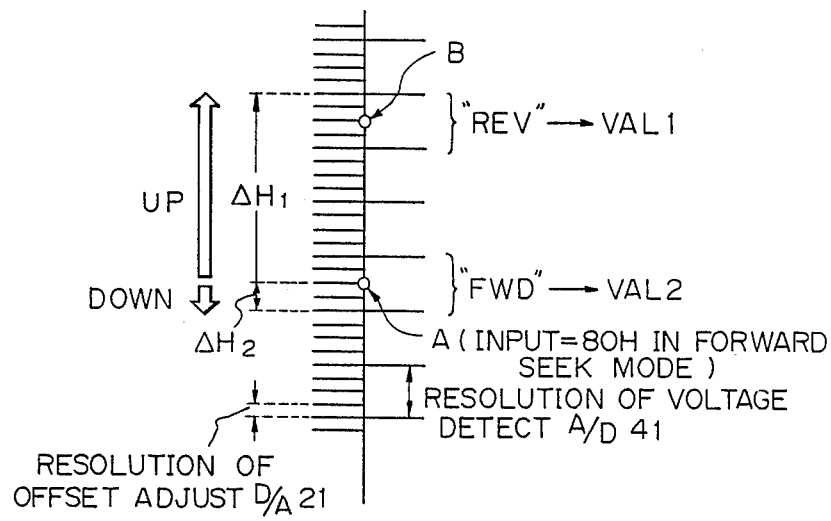
Figure 19:
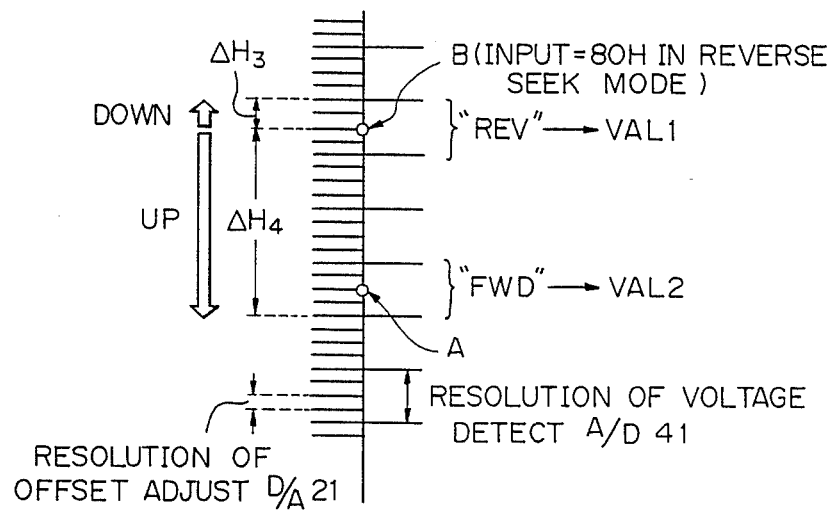

If the value "REV" is larger than the value "FWD" in the example shown in FIGS. 14 and 15, the positions of the points A and B replace each other. FIGS. 18 and 19 shows this case, wherein $\Delta H_1 = -2$, $\Delta H_2 = +14$, $\Delta H_3 = +14$, $\Delta H_4 = -2$. Therefore, the offset adjusting value is obtained as $\Delta H = +6$.

The example shown in FIGS. 18 and 19, corresponds to the characteristic curves shown in FIG. 17. In the case shown in FIG. 17, if the offset adjusting value is set as the amount corresponding to half of the voltage deviation of the point A from the point B, i.e., $\Delta H = +6$, the output voltages in the forward seek mode and the reverse seek mode become equal to the center value when the track difference is zero.

The above operations in the offset adjusting mode can be carried out at the time of the start up of the magnetic disk device, at the time of maintainance, after a power on operation, or by a command from a host computer.

As explained above, according to the present invention, it is possible to automatically cancel the difference between the output voltages in the forward seek mode and the reverse seek mode when the actual track position is near the target track position, and thus stability and credibility of magnetic disk device is greatly improved, and a troublesome manual adjustment for cancelling the offsets, can be eliminated.

In addition, owing to the above-mentioned operations, a relatively low-resolution analog to digital converter can be used for converting a detected output voltage, further, the detected output voltage of the servo amplifier circuit is level-shifted by a level shift circuit, and therefore, the accurate detection of the output voltage near zero volt using an analog to digital converter which is commercially available at a low cost, can be carried out.

I claim:

1. A servo amplifier circuit comprising:
    an output voltage detecting means for detecting an output voltage of said servo amplifier circuit;
    a target value obtaining means for obtaining a target value of said servo amplifier circuit;
    an absolute value outputting means for outputting an absolute value of said target value;
    a control direction outputting means for outputting a sign of said target value;
    an amplifier means for amplifying an output of said absolute value outputting means;
    a forward/reverse conversion means for passing said output of said amplifier means with or without inverting said output in accordance with said sign of said target value;
    a forward offset obtaining means for obtaining a forward offset which is defined as an output voltage of said servo amplifier without an adjustment when said absolute value is set to zero and said sign is set to plus;
    a reverse offset obtaining means for obtaining a reverse offset which is defined as an output voltage of said servo amplifier circuit without an adjustment when said absolute vale is set to zero and said sign is set to minus;
    an offset adjusting value obtaining means for obtaining an offset adjusting value using said forward offset and said reverse offset; and
    an offset adjusting means for modifying the input of said amplifier means using said offset adjusting value, so that the difference between said forward offset and said reverse offset is reduced.

2. A servo amplifier circuit according to claim 1, wherein said offset adjusting means adds said offset adjusting value to said absolute value.

3. A servo amplifier circuit according to claim 2, wherein said offset adjusting value obtaining means obtains said offset adjusting value as a half of a deviation of said forward offset from said reverse offset.

4. A servo amplifier circuit according to claim 3, wherein
    said target value obtaining means, said absolute value outputting means, said control direction outputting means, said forward offset obtaining means, said reverse offset obtaining means, said offset adjusting value obtaining means, are realized by a microprocessor;
    said absolute value outputting means further comprises a first digital to analog converter for obtaining an analog value of said absolute value;
    said output voltage detecting means comprising an analog to digital converter for converting said output voltage from analog to digital before inputting the output voltage into said microprocessor;
    said offset adjusting means comprising a second digital to analog converter for obtaining an analog value of said offset adjusting value;
    the resolution of said second digital to analog converter is higher than the resolution of said analog to digital converter, and
    said offset adjusting value obtaining means further comprising:
        a high resolution adjusting value obtaining means for obtaining a first variation of said offset adjusting value which variation is defined as a minimum amount of variation of said offset adjusting value by which the output voltage detected by said output voltage detecting means becomes higher than the higher of said forward offset and said reverse offset when said sign is set to plus, and a second variation of said offset adjusting value which variation is defined as a minimum amount of variation of said offset adjusting value by which the output voltage detected by said output voltage detecting means becomes lower than the lower of said forward offset and said reverse offset when said sign is set to plus, a third variation of said offset adjusting value which is defined as a minimum amount of variation of said offset adjusting value by which the output voltage detected by said output voltage detecting means becomes higher than the higher of said forward offset and said reverse offset when said sign is set to minus, and a fourth variation of said offset adjusting value which variation is defined as a minimum amount of variation of said offset adjusting value by which the output voltage detected by said output voltage detecting means becomes lower than the lower of said forward offset and said reverse offset when said sign is set to minus, and a variation averaging means for obtaining an average of said first to fourth variations as said offset adjusting value.

5. A servo amplifier circuit according to claim 4, wherein said output voltage detecting means further comprises a level shift circuit for shifting a range of a detected output voltage of said servo amplifier circuit before applying it to said analog to digital converter, so that at least the lower of said forward offset and said reverse offset becomes higher than the zero level.

* * * * *

UNITED STATES PATENT AND TRADEMARK OFFICE
CERTIFICATE OF CORRECTION

PATENT NO. : 4,908,561

DATED : March 13, 1990

INVENTOR(S) : Shuichi HASHIMOTO

It is certified that error appears in the above-identified patent and that said Letters Patent is hereby corrected as shown below:

Col. 4, line 11, change "relation ship" to --relationship--;
line 14, change "relation ship" to --relationship--;
line 16, change "relation ship" to --relationship--;
line 29, delete "the" (first occurrence).

Col. 9, line 36, "corre-spondance" should be --correspondence--.

Col. 10, line 66, change "14," (last occurrence) to -- -14,--.

Col. 11, line 51, change "maintainance" to --maintenance--.

Col. 12, line 21, after "amplifier" insert --circuit--;
line 27, change "vale" to --value--.

Signed and Sealed this

Seventeenth Day of September, 1991

Attest:

HARRY F. MANBECK, JR.

*Attesting Officer*  *Commissioner of Patents and Trademarks*